United States Patent
Suzuki et al.

(10) Patent No.: US 10,047,478 B2
(45) Date of Patent: Aug. 14, 2018

(54) PREPREG AND METHOD FOR MANUFACTURING SAME

(75) Inventors: Takaya Suzuki, Shizuoka (JP);
Toyoaki Ishiwata, Shizuoka (JP);
Yoshinori Suzuki, Shizuoka (JP);
Hiroshi Numata, Shizuoka (JP)

(73) Assignee: TOHO TENAX CO., LTD, Tokyo (JP)

( * ) Notice: Subject to any disclaimer, the term of this patent is extended or adjusted under 35 U.S.C. 154(b) by 270 days.

(21) Appl. No.: 13/981,807

(22) PCT Filed: Mar. 21, 2012

(86) PCT No.: PCT/JP2012/057160
§ 371 (c)(1),
(2), (4) Date: Jul. 25, 2013

(87) PCT Pub. No.: WO2012/133033
PCT Pub. Date: Oct. 4, 2012

(65) Prior Publication Data
US 2014/0057515 A1 Feb. 27, 2014

(30) Foreign Application Priority Data

Mar. 30, 2011 (JP) .................................. 2011-076090
Mar. 30, 2011 (JP) .................................. 2011-076102

(51) Int. Cl.
*D06M 15/55* (2006.01)
*B29D 7/01* (2006.01)
(Continued)

(52) U.S. Cl.
CPC ........... *D06M 15/55* (2013.01); *B29C 70/504* (2013.01); *B29D 7/01* (2013.01); *C08G 59/5033* (2013.01);
(Continued)

(58) Field of Classification Search
CPC .. C08J 2363/00; C08J 5/24; C08J 5/12; C08L 63/00; D06M 15/55; C09J 7/00; B29D 7/01; Y10T 442/2049
(Continued)

(56) References Cited

U.S. PATENT DOCUMENTS 4,663,401 A 5/1987 Siato et al.
2006/0182949 A1* 8/2006 Salnikov et al. ............. 428/327
(Continued)

FOREIGN PATENT DOCUMENTS

EP 0 885 704 A1 12/1998
EP 1 072 634 A1 1/2001
(Continued)

OTHER PUBLICATIONS

European Search Report dated Aug. 20, 2014.
International Search Report dated Jun. 19, 2012.

*Primary Examiner* — Camie S Thompson
(74) *Attorney, Agent, or Firm* — Norris McLaughlin & Marcus PA (57) ABSTRACT

The present invention provides a prepreg comprising: a primary pre-pregnant made of a reinforced fiber substrate and an epoxy resin composition containing at least epoxy resin and thermoplastic resin impregnated into the reinforcing fiber that forms the reinforced fiber substrate; and a surface layer made of epoxy resin composition containing at least an epoxy resin and an epoxy resin-soluble thermoplastic resin that dissolves in the epoxy resin, the surface layer being formed on one or both surfaces of the primary prepreg; the prepreg being characterized in that only one of either the epoxy resin composition of the primary prepreg or the epoxy resin composition of the surface layer contains a hardening agent for an epoxy resin.

11 Claims, 3 Drawing Sheets

(51) Int. Cl.
  *C08J 5/24*   (2006.01)
  *C08G 59/50*  (2006.01)
  *C08L 63/00*  (2006.01)
  *B29C 70/50*  (2006.01)

(52) U.S. Cl.
  CPC .............. *C08J 5/24* (2013.01); *C08L 63/00* (2013.01); *C08J 2363/00* (2013.01); *Y10T 442/2049* (2015.04)

(58) Field of Classification Search
  USPC .......................................................... 442/65
  See application file for complete search history.

(56)  References Cited

U.S. PATENT DOCUMENTS

2008/0286578 A1* 11/2008 Tilbrook et al. .............. 428/413
  2010/0178487 A1* 7/2010 Arai ........................... C08J 5/24
                                                                       428/300.1
  2011/0111663 A1 5/2011 Kawamoto et al.

FOREIGN PATENT DOCUMENTS

JP    55-93613 A    7/1980
  JP    60-243113 A    12/1985
  JP    5-38718    2/1993
  JP    07-041575 A    2/1995
  JP    07-041576 A    2/1995
  JP    07-041577 A    2/1995
  JP    08-259713 A    10/1996
  JP    2000-334874 A    12/2000
  JP    2010-144118 A    7/2010
  WO    WO2008-018421    *    2/2008
  WO    2009157295 A1    12/2009

* cited by examiner

PREPREG AND METHOD FOR MANUFACTURING SAME

This application is a 371 application of PCT/JP2012/057160 filed Mar. 21, 2012, which claims foreign priority benefit under 35 U.S.C. § 119 of Japanese application Nos. 2011-076090 filed Mar. 30, 2011 and 2011-076102 filed Mar. 30, 2011.

TECHNICAL FIELD

The present invention relates to a prepreg superior in storage stability and a method for manufacturing the prepreg.

BACKGROUND ART

A composite material composed of a carbon fiber and a resin has a lightweight, a high strength, a high elastic modulus, etc. and, for these reasons, is in wide use in aeroplane, sports, leisure, and general industry. The composite material is manufactured, in many cases, via a prepreg in which a carbon fiber and a resin are integrated.

A thermosetting resin or a thermoplastic resin is used as the resin which constitutes the prepreg. There is widely used a prepreg which uses, in particular, a thermosetting resin because it can give a prepreg of high in tackiness, draping property and moldability. However, since a thermosetting resin has low toughness generally, a composite material manufactured using a prepreg composed of such a thermosetting resin has low impact resistance generally.

The methods described in Patent Literatures 1 to 5 are known for improvement of the impact resistance of such a composite material.

The Patent Literature 1 discloses a resin composition improved in toughness by dissolution of a thermoplastic resin in a thermosetting resin. In this resin composition, the toughness is improved correspondingly with the amount of the thermoplastic resin dissolved. Accordingly, a large amount of a thermoplastic resin need be dissolved in a thermosetting resin in order to obtain a resin composition of sufficiently high toughness. However, a thermosetting resin having a large amount of a thermoplastic resin dissolved therein has a very high viscosity, making it difficult, in the manufacturing of a prepreg, to impregnate a sufficient amount of a resin into a reinforcing fiber substrate. A composite material manufactured using a prepreg in which a sufficient amount of a resin is not impregnated into a reinforcing fiber substrate, has many defects such as void and the like. Consequently, such a composite material has problems in compressibility, damage allowance, etc.

The Patent Literatures 2 to 4 disclose prepregs obtained by localizing fine particles of a thermoplastic resin on the surface of a prepreg composed of a reinforcing fiber and a thermosetting resin composition. These prepregs have a particulate thermoplastic resin on the surfaces and accordingly are low in initial tackiness. Further, in these prepregs, since the curing reaction of thermosetting resin composition proceeds with time, the tackiness and draping property decrease with time. A composite material manufactured using a prepreg in which a curing reaction has proceeded, has many defects such as void and the like. Consequently, a composite material manufactured using a prepreg in which a curing reaction has proceeded, is significantly low in mechanical properties.

The Patent Literature 5 discloses a prepreg in which a thermoplastic resin having a particulate, fibrous or filmy shape is present in the vicinity of one or both surfaces of a prepreg. When a thermoplastic resin having a particulate or fibrous shape is used, the prepreg obtained has low tackiness and the composite material obtained has low mechanical properties, due to the same reasons as mentioned with respect to the Patent Literatures 2 to 4. When a thermoplastic resin having a filmy shape is used, the tackiness and draping property which are merits of thermosetting resin, are lost. Further, the defects such as low solvent resistance and the like, derived from the thermoplastic resin are strikingly reflected in the composite material obtained.

CITATION LIST

Patent Literatures

Patent Literature 1: JP-A-1985-243113
Patent Literature 2: JP-A-1995-41575
Patent Literature 3: JP-A-1995-41576
Patent Literature 4: JP-A-1995-41577
Patent Literature 5: JP-A-1996-259713

SUMMARY OF INVENTION

Technical Problem

The aim of the prevent invention is to alleviate the problems of the prior arts and provide:

a prepreg which is superior in tackiness, draping property and storage stability and which can manufacture a composite material of high impact resistance and high interlaminar toughness, and a method for manufacturing the prepreg.

Solution to Problem

The present inventors thought of localizing a curing agent for thermosetting resin, in a prepreg. The present inventors impregnated an epoxy resin composition composed of an epoxy resin and a thermoplastic resin, into a reinforcing fiber layer, to manufacture a primary prepreg, and then formed, on the surface of this primary prepreg, a surface layer composed mainly of an epoxy resin and integrated the primary prepreg and the surface layer into one piece, to obtain a prepreg. When, in this prepreg, either of the epoxy resin composition of primary prepreg and the epoxy resin composition of surface layer was allowed to contain a curing agent for epoxy resin, the epoxy resin composition to which the curing agent for epoxy resin had been added, contained a curing agent for epoxy resin in an amount larger than in ordinary epoxy resin composition; however, it was found that the prepreg obtained was superior in tackiness, draping property and storage stability. It was further found that such a prepreg could give a composite material superior in impact resistance and interlaminar toughness. The finding has led to the completion of the present invention.

The prepreg of the present invention is a prepreg comprising:

a primary prepreg composed of a reinforcing fiber substrate and an epoxy resin composition containing at least an epoxy resin and a thermoplastic resin, impregnated into the reinforcing fiber layer formed by the reinforcing fiber substrate, and a surface layer composed of an epoxy resin composition containing at least an epoxy resin and an epoxy resin-soluble thermoplastic resin dissolved in an epoxy resin, the surface layer being formed on one side or both sides of the primary prepreg,
wherein only either of the epoxy resin composition of the primary prepreg and the epoxy resin composition of the surface layer contains a curing agent for epoxy resin.

The first embodiment of the prepreg of the present invention is a prepreg comprising:

a primary prepreg composed of a reinforcing fiber substrate and an epoxy resin composition [A] impregnated into the reinforcing fiber layer formed by the reinforcing fiber substrate, and a surface layer composed of an epoxy resin composition [B], formed on one side or both sides of the primary prepreg, wherein the epoxy resin compositions [A] and [B] each have the following formulation.

Epoxy resin composition [A]: an epoxy resin composition containing at least an epoxy resin, a curing agent for epoxy resin, and a thermoplastic resin.

Epoxy resin composition [B]: an epoxy resin composition containing at least an epoxy resin and an epoxy resin-soluble thermoplastic resin dissolved in an epoxy resin but containing no curing agent for epoxy resin.

The second embodiment of the prepreg of the present invention is a prepreg comprising:

a primary prepreg composed of a reinforcing fiber substrate and an epoxy resin composition [C] impregnated into the reinforcing fiber layer formed by the reinforcing fiber substrate, and a surface layer composed of an epoxy resin composition [D], formed on one side or both sides of the primary prepreg, wherein the epoxy resin compositions [C] and [D] each have the following formulation.

Epoxy resin composition [C]: an epoxy resin composition containing at least an epoxy resin and a thermoplastic resin but containing no curing agent for epoxy resin.

Epoxy resin composition [D]: an epoxy resin composition containing at least an epoxy resin, a curing agent for epoxy resin, and an epoxy resin-soluble thermoplastic resin dissolved in an epoxy resin.

Effects of Invention

In the prepreg of the this present invention, a curing agent for epoxy resin is localized in the prepreg. Therefore, the prepreg shows excellent tackiness and draping property over a long period. Consequently, with the prepreg of the present invention, a composite material small in structural defect (e.g. void) can be manufactured even after long-term storage of the prepreg.

In the composite material manufactured by laminating a plurality of prepregs of the present invention, the matrix resin layer composed mainly of an epoxy resin is modified by a thermoplastic resin. Consequently, there can be manufactured a composite material which is low in the propagation of crack during impact and superior in impact resistance.

REFERENCE SIGNS LIST 100, 200 . . . Prepreg
110, 210 . . . Primary prepreg
111, 211 . . . Carbon fiber
112, 212 . . . Reinforcing fiber layer
113 . . . Resin composition [A]
213 . . . Resin composition [C]
113a . . . Resin A film
213a . . . Resin C film
115 . . . Resin composition [B]
215 . . . Resin composition [D]
115a . . . Resin B film
215a . . . Resin D film
10 . . . Primary prepreg
13a . . . Resin A film
14a . . . Release paper
15a . . . Resin B film
21 . . . Reinforcing fiber layer
23 . . . Roll of resin A film or resin C film
24 . . . Wind roll of release paper
25 . . . Roll of resin B film or resin D film
40, 41 . . . Hot roller
101 . . . Wind roll of prepreg

DESCRIPTION OF EMBODIMENTS

The prepreg of the present invention is a prepreg comprising:

a primary prepreg composed of a reinforcing fiber substrate and an epoxy resin composition containing at least an epoxy resin and a thermoplastic resin, impregnated into the reinforcing fiber layer formed by the reinforcing fiber substrate, and a surface layer composed of an epoxy resin composition containing at least an epoxy resin and a thermoplastic resin dissolved in an epoxy resin, the surface layer being formed on one side or both sides of the primary prepreg,
wherein only either of the epoxy resin composition of the primary prepreg and the epoxy resin composition of the surface layer contains a curing agent for epoxy resin.

In the present invention, the curing agent for epoxy resin is localized in the prepreg. Therefore, the curing reaction of epoxy resin proceeds hardly during the storage of the prepreg (such a reaction during the prepreg storage is undesirable). Consequently, the prepreg of the present invention shows excellent tackiness and draping property over a long period. As a result, the prepreg of the present invention allows for manufacturing of a composite material little in structural defect (e.g. void), even after long-term storage.

In the present invention, the epoxy resin composition containing a curing agent contains a curing agent in an amount appropriate to cure the total amount of the epoxy resins contained in the prepreg. Therefore, the epoxy resin composition containing a curing agent, used in the present invention contains a curing agent in an amount larger than contained in ordinary epoxy resin composition. However, even when, in the epoxy resin composition containing a curing agent, a reaction between epoxy resin and curing agent takes place, the excessive amount of the curing agent suppresses the curing of resin composition caused by the crosslinking reaction of epoxy resin. Further, since the curing agent for epoxy resin is localized in the prepreg, no curing reaction proceeds in the epoxy resin composition containing no curing agent. As a result, the prepreg of the present invention shows no reduction in tackiness or draping property over a long period.

In the present invention, the amount of the curing agent contained in the epoxy resin composition containing a curing agent is appropriately controlled depending upon the kind of epoxy resin or curing agent used. For example, when an aromatic diamine compound is used as the curing agent, the amount of curing agent used is preferably 25 to 55 mass parts relative to 100 mass parts of total epoxy resins.

In the prepreg of the present invention, the mass ratio of the epoxy resin composition of primary prepreg and the epoxy resin composition of surface layer is preferably 9:1 to 1:1.

Hereinafter, the prepreg of the present invention is described in more detail.

[First Embodiment of Present Invention] (Prepreg Wherein the Primary Prepreg Contains a Curing Agent)

The prepreg of the first embodiment of the present invention is described below.
(1) Structure of Prepreg The prepreg of the first embodiment of the present invention is a prepreg comprising:

a primary prepreg composed of a reinforcing fiber substrate and an epoxy resin composition [A] impregnated into the reinforcing fiber layer formed by the reinforcing fiber substrate, and a surface layer composed of an epoxy resin composition [B], formed on one side or both sides of the primary prepreg, wherein the primary prepreg and the surface layer are integrated into one piece.

Figure 1:
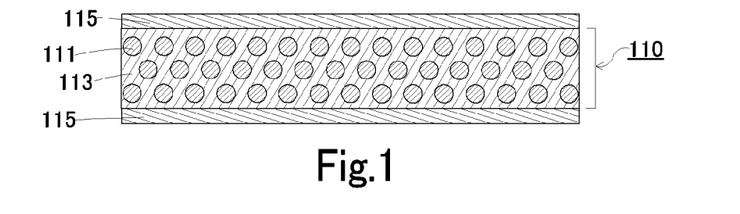
FIG. 1 is a schematic drawing showing the section of the prepreg of the first embodiment of the present invention.

FIG. 1 is a schematic drawing showing the section of the prepreg of the first embodiment of the present invention. In FIG. 1, 100 is a prepreg of the first embodiment of the present invention and 110 is a primary prepreg. The primary prepreg 110 is constituted by a reinforcing fiber layer composed of a carbon fiber 111 and an epoxy resin composition [A] 113 impregnated into the reinforcing fiber layer. On the surface of the primary prepreg 110 is formed a surface layer composed of a resin composition [B] 115, integrally with the primary prepreg 110.

In the prepreg of the first embodiment of the present invention, the mass ratio of the epoxy resin contained in the epoxy resin composition [A] and the epoxy resin contained in the epoxy resin composition [B] is preferably 9:1 to 1:1.
(2) Primary Prepreg In the first embodiment of the present invention, the primary prepreg is composed of a reinforcing fiber layer present in the central portion of prepreg section and an epoxy resin composition [A] impregnated into the reinforcing fiber layer. The primary prepreg is represented by a primary prepreg 110 in FIG. 2(b) and FIG. 2(c).

The reinforcing fiber substrate used in the primary prepreg is a substrate obtained by processing a reinforcing fiber into a desired shape. The reinforcing fiber substrate preferably has a sheet shape. As the reinforcing fiber, there can be used, for example, a carbon fiber, a glass fiber, an aramid fiber, a silicon carbide fiber, a polyester fiber, a ceramic fiber, an alumina fiber, a boron fiber, a metal fiber, a mineral fiber, an ore fiber and a slag fiber. Of these reinforcing fibers, preferred are a carbon fiber, a glass fiber and an aramid fiber. A carbon fiber is preferred particularly because it can give a composite material of high specific strength, high specific elastic modulus, lightweight and high strength. A PAN-based carbon fiber of high tensile strength is preferred most.

The carbon fiber preferably has a tensile elastic modulus of 170 to 600 GPa, particularly 220 to 450 GPa. Also, the carbon fiber preferably has a tensile strength of at least 3,920 MPa (400 kgf/mm$^2$). By using such a carbon fiber, the composite material obtained can have very high mechanical properties.

As the sheet-shaped reinforcing fiber substrate, there can be mentioned a sheet obtained by aligning a number of reinforcing fibers in one direction, a bi-directional fabric (e.g. plain weave or twill weave), a multi-axial fabric, a non-woven fabric, a mat, a knit, a braid, and a paper obtained by subjecting a reinforcing fiber to sheeting. The thickness of the sheet-shaped substrate is preferably 0.01 to 3 mm, more preferably 0.1 to 1.5 m.
(3) Epoxy Resin Composition [A]

The epoxy resin composition [A] contains at least an epoxy resin, a curing agent for epoxy resin, and a thermoplastic resin. Each component used in the epoxy resin composition [A] is described below.
(i) Epoxy Resin The epoxy resins used in the first embodiment of the present invention are known epoxy resins. Of these resins, an epoxy resin having an aromatic group is preferred, and an epoxy resin containing either of a glycidyl amine structure and a glycidyl ether structure is preferred particularly. An alicyclic epoxy resin may also be used preferably. Specifically, there can be used, for example, the epoxy resins shown below.

As the epoxy resin containing a glycidyl amine structure, there can be mentioned, for example, various isomers of tetraglycidyl diaminodiphenyl methane, N,N,O-triglycidyl-p-aminophenol, N,N,O-triglyciyl-m-aminophenol, N,N,O-triglyciyl-3-methyl-4-aminophenol and triglyciyl aminocresol.

As the epoxy resin containing a glycidyl ether structure, there can be mentioned, for example, bisphenol A type epoxy resin, bisphenol F type epoxy resin, bisphenol S type epoxy resin, phenolic novolac type epoxy resin, and cresol novolac type epoxy resin.

These epoxy resins may have a non-reactive substituent group at, for example, the aromatic ring structure. As the non-reactive substituent group, there can be mentioned, for example, an alkyl group (e.g. methyl, ethyl or isopropyl), an aromatic group (e.g. phenyl), an alkoxyl group, an aralkyl group, and a halogen group (e.g. chlorine or bromine).

The epoxy resin composition [A] preferably contain at least one kind of trifunctional epoxy resin. Epoxy resin gives rise to a thermosetting reaction with a curing agent and causes crosslinking to form a network structure. When a trifunctional epoxy resin is used, the crosslink density after curing is high, whereby a composite material of excellent mechanical properties can be obtained.

The content of the trifunctional epoxy resin is preferably 30 mass % or more, particularly preferably 30 to 70 mass %, relative to the total amount of the epoxy resins used in the epoxy resin composition [A] and the epoxy resin composition [B] (hereinafter, the total amount is referred to as "total epoxy resin amount" in some cases). When the content exceeds 70 mass %, the prepreg obtained has low handleability in some cases.

The content of the trifunctional epoxy resin is preferably 10 mass % or more, particularly preferably 20 to 75 mass % relative to the epoxy resin amount in the epoxy resin composition [A].

As the trifunctional epoxy resin, there can be mentioned, for example, N,N,O-triglycidyl-p-aminophenol and N,N,O-triglycidyl-m-aminophenol.

These epoxy resins may be used singly or in combination of two or more kinds.

(ii) Curing Agent

The curing agent used in the present invention is a known curing agent used for curing of epoxy resin. Specifically, there can be mentioned dicyandiamide, various isomers of aromatic amine curing agents, and aminobenzoic acid esters. Dicyandiamide is preferred for the excellent storage stability of prepreg. Aromatic diamine compounds such as 4,4'-diaminodiphenylsulfone, 3,3'-diaminodiphenylsulfone, 4,4'-diaminodiphenylmethane and the like, and derivatives thereof having a non-reactive substituent group are particularly preferred because they can give a cured material of high heat resistance. 3,3'-Diaminodiphenylsulfone is most preferred because it gives a cured material of high toughness. The non-reactive substituent group was explained in the above (i) Epoxy resin.

As the aminobenzoic acid esters, there are preferably used trimethylene glycol di-p-aminobenzoate and neopentylglycol di-p-aminobenzoate. A composite material obtained by curing using such a curing agent, as compared with a composite material obtained by curing using an isomer of diaminodiphenylsulfone, is low in heat resistance but high in tensile elongation. Accordingly, a curing agent is selected appropriately depending upon the usage of composite material.

The amount of the curing agent contained in the epoxy resin composition [A] is an amount which is appropriate to cure all the epoxy resins used in the epoxy resin composition [A] and the epoxy resin composition [B], and is controlled appropriately depending upon the kinds of epoxy resin used and curing agent used. For example, when an aromatic diamine compound is used as the curing agent, the amount thereof is preferably 25 to 55 mass parts relative to 100 mass parts of the total epoxy resins. From the standpoint of storage stability, the amount of curing agent is preferably 30 to 100 mass parts, particularly preferably 30 to 70 mass parts, relative to 100 mass parts of the epoxy resin contained in the epoxy resin composition [A].

(iii) Thermoplastic Resin

The thermoplastic resins used in the first embodiment of the present invention are known thermoplastic resins. Thermoplastic resin is largely divided into epoxy resin-soluble thermoplastic resin and epoxy resin-insoluble thermoplastic resin.

In order to obtain a composite material of high impact resistance, it is requisite that the epoxy resin composition [A] contains an epoxy resin-soluble thermoplastic resin or an epoxy resin-insoluble thermoplastic resin. It is particularly preferred that the epoxy resin composition [A] contains both of an epoxy resin-soluble thermoplastic resin and an epoxy resin-insoluble thermoplastic resin.

When the epoxy resin-soluble thermoplastic resin used is completely soluble in the epoxy resin used, it is preferred that an epoxy resin-soluble thermoplastic resin and an epoxy resin-insoluble thermoplastic resin are compounded in the epoxy resin composition [A]. Meanwhile, when the epoxy resin-soluble thermoplastic resin used is partially soluble in the epoxy resin used, it is preferred that only an epoxy resin-soluble thermoplastic resin or both of the epoxy resin-soluble thermoplastic resin and an epoxy resin-insoluble thermoplastic resin is compounded in the epoxy resin composition [A].

In the present invention, "epoxy resin-soluble thermoplastic resin" refers to a thermoplastic resin which is soluble partially or completely in an epoxy resin, at a temperature at which a composite material is molded, or at a lower temperature. A thermoplastic resin which is soluble partially, excludes "substantially insoluble thermoplastic resins" (described later). As specific examples of the epoxy resin-soluble thermoplastic resin, there can be mentioned polyethersulfone, polysulfone, polyetherimide and polycarbonate. These may be used singly or in combination of two or more kinds.

The epoxy resin-soluble thermoplastic resin is dissolved in an epoxy resin in the curing step of molding a composite material from a prepreg, and this resin also has an effect of increasing viscosity of the epoxy resin composition and preventing the resin from flowing out of the prepreg.

The epoxy resin-soluble thermoplastic resin preferably has a reactive group reactive with the epoxy resin used. The epoxy resin-soluble thermoplastic resin having a reactive group reactive with the epoxy resin used is preferred because it has a toughness-improving effect, chemical resistance, heat resistance, moist heat resistance, and stable solubility in the curing step of molding a composite material from the prepreg obtained.

The epoxy resin-soluble thermoplastic resin may be compounded after all or part of the resin has been dissolved in an epoxy resin, or may be compounded in the form of dispersed particles without being dissolved in an epoxy resin. Preferably, the epoxy resin-soluble thermoplastic resin dissolves in an epoxy resin in the curing step of molding a composite material from the prepreg obtained. Incidentally, the temperature at which a composite material is molded, is generally 100 to 190° C.

The amount of the epoxy resin-soluble thermoplastic resin compounded is preferably 5 to 50 mass parts, more preferably 15 to 40 mass parts relative to 100 mass parts of the total epoxy resins used in the prepreg of the first embodiment. With an amount of less than 5 mass parts, a composite material manufactured from the prepreg obtained has insufficient impact resistance in some cases. With an amount exceeding 50 mass parts, the epoxy resin composition [A] obtained has a high viscosity and is low in handleability in some cases.

It is preferred from the processability of the primary prepreg prepared that the epoxy resin-soluble thermoplastic resin is compounded in an amount of 5 to 60 mass parts relative to 100 mass parts of the epoxy resins contained in the epoxy resin composition [A].

The form of the epoxy resin-soluble thermoplastic resin is not particularly restricted but is preferably particulate. An epoxy resin-soluble thermoplastic resin of particulate form can be compounded homogeneously in the epoxy resin composition and further can give a prepreg of high moldability. The average particle diameter of the epoxy resin-soluble thermoplastic resin is preferably 1 to 50 μm, particularly preferably 3 to 30 μm. With an average particle diameter of smaller than 1 μm, the epoxy resin composition obtained has a strikingly high viscosity. Therefore, it is difficult, in some cases, to allow the epoxy resin composition to contain a sufficient amount of the epoxy resin-soluble thermoplastic resin. With an average particle diameter exceeding 50 μm, it is difficult, in some cases, to obtain a sheet of uniform thickness when the epoxy resin composition is subjected to sheeting.

In the present invention, "epoxy resin-insoluble thermoplastic resin" refers to a thermoplastic resin which is substantially insoluble in an epoxy resin, at a temperature at which a composite material is molded, or at a lower temperature. That is, it refers to a thermoplastic resin which shows no change in particle size or shape when added to an epoxy resin at a temperature at which a composite material is molded. Incidentally, the temperature of molding a composite material is generally 100 to 190° C.

The epoxy resin-insoluble thermoplastic resin and part of the epoxy resin-soluble thermoplastic resin (the portion of epoxy resin-soluble thermoplastic resin remaining undissolved in the matrix resin after curing) are dispersed in the matrix resin of composite material, in the form of particles (hereinafter, these dispersed particles are referred to as "interlaminar particles" in some cases). The interlaminar particles suppress the propagation of the impact which the composite material receives. As a result, the composite material has higher impact resistance. The amount of the interlaminar particles is preferably 5 to 60 mass parts relative to 100 mass parts of the total epoxy resins contained in the composite material.

As the epoxy resin-insoluble thermoplastic resin, there can be mentioned, for example, polyamide, polyacetal, polyphenylene oxide, polyphenylene sulfide, polyester, polyamideimide, polyimide, polyether ketone, polyether ether ketone, polyethylene naphthalate, polyaramid, polyether nitrile, and polybenzimidazole. Of these, polyamide, polyamide imide and polyimide are preferred for their high toughness and heat resistance. Polyamide and polyimide are particularly superior in toughness improvement for composite material. They may be used singly or in combination of two or more kinds. Also, copolymers thereof may be used.

Amorphous polyimide, and polyamide such as nylon 6 (trade mark) (a polyamide obtained by ring-opening polycondensation of caprolactam), nylon 12 (a polyamide obtained by ring-opening polycondensation of lauryllactam), and amorphous nylon (is also called transparent nylon and is a nylon which causes no polymer crystallization or is extremely slow in polymer crystallization rate), can improve the heat resistance of composite material very effectively.

The use amount of the epoxy resin-insoluble thermoplastic resin is preferably 10 to 45 mass parts, particularly preferably 20 to 45 mass parts relative to 100 mass parts of the total epoxy resin amount in the prepreg of the first embodiment of the present invention. With an amount of less than 10 mass parts, the composite material obtained has insufficient impact resistance in some cases. When the use amount of the epoxy resin-insoluble thermoplastic resin exceeds 45 mass parts, the prepreg obtained is low in resin impregnation amount, draping property, etc. in some cases.

The form of the epoxy resin-insoluble thermoplastic resin is not particularly restricted but is preferably particulate. An epoxy resin-insoluble thermoplastic resin of particulate form can be compounded homogeneously in the epoxy resin composition and further can give a prepreg of high moldability. The average particle diameter of the epoxy resin-insoluble thermoplastic resin is preferably 1 to 50 µm, particularly preferably 3 to 30 µm. With an average particle diameter of smaller than 1 µm, the epoxy resin composition obtained has a strikingly high viscosity. Therefore, it is difficult, in some cases, to allow the epoxy resin composition to contain a sufficient amount of the epoxy resin-insoluble thermoplastic resin. With an average particle diameter exceeding 50 µm, it is difficult, in some cases, to obtain a sheet of uniform thickness when the epoxy resin composition is subjected to sheeting.

(4) Epoxy Resin Composition [B]

The epoxy resin composition [B] is composed of at least an epoxy resin and an epoxy resin-soluble thermoplastic resin dissolved in the epoxy resin. The epoxy resin composition [B] contains no curing agent. The epoxy resin composition [B] constitutes, in FIG. 2(c), a surface layer 115a of the prepreg of first embodiment. Each component used in the epoxy resin composition [B] is described below.

(i) Epoxy Resin

The epoxy resins contained in the epoxy resin composition [B] are known epoxy resins. In order for the composite material obtained to exhibit excellent mechanical properties, an epoxy resin containing an aromatic group is preferred, and an epoxy resin containing either of a glycidyl amine structure and a glycidyl ether structure is preferred particularly. An alicyclic epoxy resin may also be used preferably. These epoxy resins may be used alone or in combination of two or more kinds.

(ii) Curing Agent

The epoxy resin composition [B] contains no curing agent.

(iii) Thermoplastic Resin

The epoxy resin composition [B] contains a thermoplastic resin dissolved in an epoxy resin. The thermoplastic resin compounded in the epoxy resin composition [B] is the same as the epoxy resin-soluble thermoplastic resin described previously.

The epoxy resin-soluble thermoplastic resin compounded in the epoxy resin composition [B] may be the same as or different from the epoxy resin-soluble thermoplastic resin compounded in the epoxy resin composition [A].

The content of the epoxy resin-soluble thermoplastic resin contained in the epoxy resin composition [B] is preferably 5 to 50 mass parts, particularly preferably 15 to 40 mass parts relative to 100 mass parts of the epoxy resins contained in the epoxy resin composition [B]. With a content of less than 5 mass parts, the composite material manufactured using the prepreg obtained has insufficient impact resistance in some cases. With a content exceeding 50 mass parts, the epoxy resin composition [B] has a strikingly high viscosity and is low in handleability in some cases.

(5) Method for Manufacturing of Prepreg

The prepreg of the first embodiment of the present invention can be manufactured using a known method. It is preferred to manufacture the prepreg, in particular, by a dry method of heating a resin composition to lower its viscosity and impregnate the resin composition into a reinforcing fiber layer. This dry method, as compared with a wet method of dissolving a resin composition in an organic solvent, impregnating the dissolved resin composition into a reinforcing fiber layer, and then removing the organic solvent, is preferred because there is no remaining of organic solvent. Below is explained a method of manufacturing a prepreg of the first embodiment of the present invention by the dry method.

At first, a film composed of the epoxy resin composition [A] and a film composed of the epoxy resin composition [B] (hereinafter, they are referred to as "resin A film" and "resin B film", respectively) are each produced by a known method. Next, the resin A film is laminated on one side or both sides in thickness direction, of a reinforcing fiber layer composed of a carbon fiber or the like, and they are subjected to hot pressing using a hot roller or the like. The hot pressing allows the epoxy resin composition [A] of resin A film to be impregnated into the reinforcing fiber layer, whereby a primary prepreg is obtained. Thereafter, the resin B film is laminated on one side or both sides in thickness direction, of the primary prepreg, and they are subjected to hot pressing using a hot roller or the like. The hot pressing integrates the primary prepreg and the resin B film into one piece in a laminated state, whereby a prepreg of the first embodiment of the present invention is obtained.

Figure 2A:
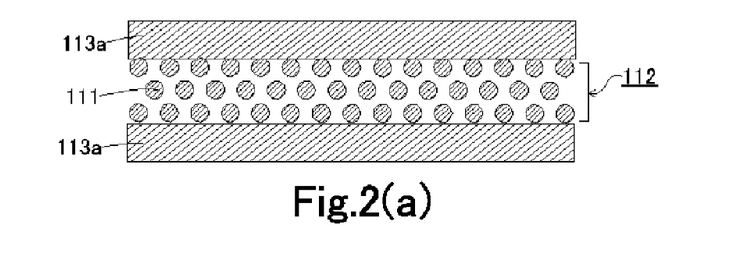
FIGS. 2(a) to 2(c) are drawings showing in order the process in which the prepreg of the first embodiment of the present invention is manufactured.
Figure 2B:
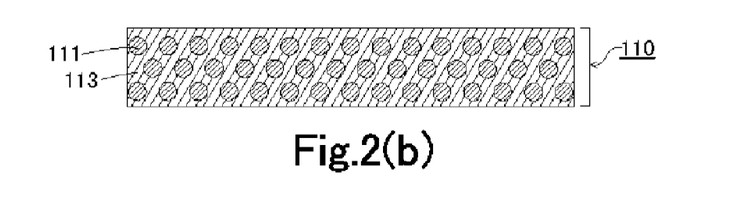
Figure 2C:
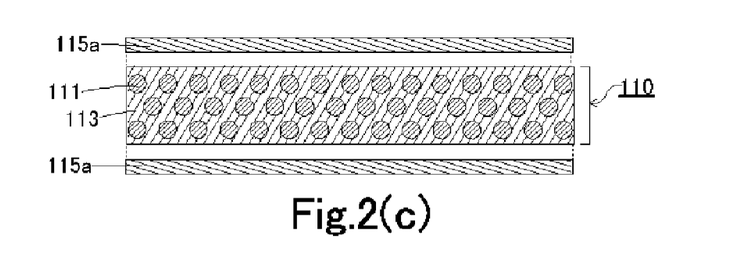

FIGS. 2(a) to 2(c) are drawings showing in order the steps of manufacturing a prepreg of the first embodiment of the present invention. At first, a resin A film 113a composed of an epoxy resin composition [A] is laminated on both sides in thickness direction, of a reinforcing fiber layer 112 composed of a reinforcing fiber 111 (FIG. 2(a)). The reinforcing fiber layer 112 and the resin A film 113a are subjected to hot pressing using a hot roller or the like. The hot pressing allows the epoxy resin composition [A] to be impregnated into the reinforcing fiber layer 112, whereby a primary prepreg 110 is obtained (FIG. 2(b)). Then, a resin B film 115a composed of an epoxy resin composition [B] is laminated on both sides in thickness direction, of the primary prepreg 110 (FIG. 2(c)). The primary prepreg 110 and the resin B film 115a are subjected to hot pressing using a hot roller or the like. The hot pressing integrates the primary prepreg 110 and the resin B film 115a into one piece, whereby a prepreg 100 of the first embodiment is obtained (FIG. 1).

Figure 5:
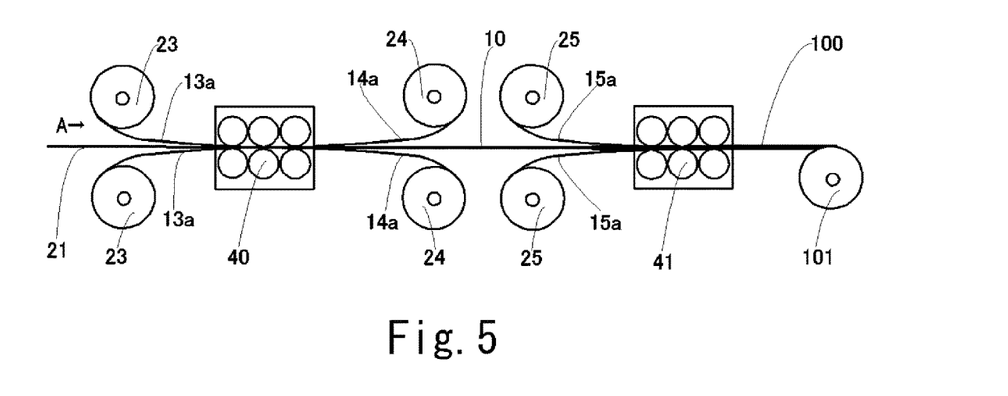
FIG. 5 is a conceptual drawing showing an example of the production steps of the prepreg of the present invention.

FIG. 5 is a conceptual drawing showing an example of the steps of manufacturing a prepreg of the first embodiment of the present invention. In FIG. 5, 21 is a reinforcing fiber layer obtained by aligning fibers (e.g. carbon fibers) into one direction, and runs to an arrow A direction. On both sides in thickness direction, of the reinforcing fiber layer 21 are laminated resin A films 13a each having thereon a release paper 14a, fed from a film roll 23. The reinforcing fiber layer 21 and the resin A film 13a are subjected to hot pressing via release papers 14a, using a hot roller 40. A primary prepreg 10 is formed by the hot pressing. Then, the release papers 14a laminated on both sides of the primary prepreg are released from the primary prepreg 10 and wound up by rollers 24. Thereafter, on both sides of the release paper-removed primary prepreg 10 are laminated resin B films 15a each having thereon a release paper, fed from film rolls 25. The primary prepreg 10 and the resin B films 15a are subjected to hot pressing via the release papers, using hot rollers 41. A prepreg 100 of the first embodiment of the present invention is formed by the hot pressing. The prepreg 100 having a release paper on both sides is wound up by a roller 101.

The hot-pressing temperature of the resin A film is 70 to 160° C., preferably 90 to 140° C. When the temperature is lower than 70° C., the viscosity of the epoxy resin composition [A] constituting the resin A film is not reduced sufficiently. As a result, it is difficult to allow the epoxy resin composition [A] to be impregnated into the reinforcing fiber layer sufficiently. When the temperature exceeds 160° C., the epoxy resin composition [A] tends to cure. As a result, the prepreg obtained tends to be low in draping property.

The line pressure employed during hot pressing of the resin A film is 1 to 25 kg/cm, preferably 2 to 15 kg/cm. When the line pressure is lower than 1 kg/cm, it is difficult to impregnate the resin composition [A] (constituting the resin A film) sufficiently into the reinforcing fiber layer. When the line pressure exceeds 25 kg/cm, the reinforcing fiber tends to be damaged.

The temperature employed during hot pressing of the resin B film is 50 to 90° C., preferably 60 to 80° C. When the temperature is lower than 50° C., the surface tackiness is too high; as a result, the releasability of resin film is low and the steps of prepreg manufacturing are not stable in some cases. When the temperature exceeds 90° C., the epoxy resin composition [B] constituting the resin B film and the epoxy resin composition [A] constituting the primary prepreg cause mixing with each other and a reaction with curing agent proceeds. As a result, the prepreg obtained, when stored for a long period, causes reduction in tackiness and draping property.

The line pressure employed during hot pressing of the resin B film is 0.1 to 10 kg/cm, preferably 0.5 to 6 kg/cm. When the line pressure is lower than 0.1 kg/cm, the primary prepreg and the resin B film do not adhere to each other sufficiently. When the line pressure exceeds 10 kg/cm, the epoxy resin composition [B] constituting the resin B film and the epoxy resin composition [A] constituting the primary prepreg mix with each other, inviting a reaction with curing agent. As a result, the prepreg obtained, when stored for a long period, causes reduction in tackiness and draping property.

In the prepreg of the first embodiment of the present invention, manufactured by the above-mentioned method, an epoxy resin composition [A] 113 is impregnated into a reinforcing fiber layer, as shown in FIG. 1.

The manufacturing speed of the prepreg is not restricted particularly. However, it is at least 0.1 m/min, preferably at least 1 m/min, particularly preferably at least 5 m/min in view of the productivity and economy.

Each of the resin A film and the resin B film can be produced by a known method. For example, the resin A or B film can be produced by casting the epoxy resin composition [A] or [B] on a substrate (e.g. release paper or release film) using a die coater, an applicator, a reverse roll coater, a comma coater, a knife coater or the like. The resin temperature in film production is set appropriately depending upon the formulation and viscosity of the resin composition used.

The thickness of the resin B film is preferably 2 to 30 μm, particularly preferably 5 to 20 μm. When the thickness is smaller than 2 μm, the prepreg obtained has low tackiness. When the thickness exceeds 30 μm, the prepreg obtained tends to be low in handleability and molding precision when molded into a composite material.

The prepreg of the first embodiment of the present invention can be manufactured not only by the above-mentioned method but also, for example, by laminating the resin A film and the resin B film in order on one side or both sides in thickness direction, of the reinforcing fiber layer and then subjecting them to hot pressing in one step. In this case, it is necessary that the hot pressing is conducted at a low temperature in order to avoid the diffusion of the curing agent contained in the epoxy resin composition [A] into the epoxy resin composition [B].

In the prepreg of the first embodiment of the present invention, the content of the reinforcing fiber substrate is preferably 40 to 80 mass %, particularly preferably 50 to 70 mass %. When the content is lower than 40 mass %, the composite material manufactured using the prepreg is low in strength, etc. When the content exceeds 80 mass %, the resin amount impregnated into the reinforcing fiber layer is insufficient. As a result, voids, etc. appear in the composite material manufactured using the prepreg.

The prepreg of the first embodiment of the present invention may contain a stabilizer, a release agent, a filler, a coloring agent, etc. as long as the effect of the present invention is not impaired.

In the prepreg of the first embodiment of the present invention, the curing agent contained in the epoxy resin composition [A] is diffused into the epoxy resin composition [B] by the heating conducted to give rise to a curing reaction. Thereby, both the epoxy resin composition [A] and the epoxy resin composition [B] are cured.

[Second Embodiment of Present Invention]
(Prepreg Wherein the Surface Layer Contains a Curing Agent)

The prepreg of the second embodiment of the present invention is described below.
(1) Structure of Prepreg The prepreg of the second embodiment of the present invention is a prepreg comprising:
a primary prepreg composed of a reinforcing fiber substrate and an epoxy resin composition [C] impregnated into the reinforcing fiber layer formed by the reinforcing fiber substrate, and
a surface layer composed of an epoxy resin composition [D], formed on one side or both sides of the primary prepreg, wherein the primary prepreg and the surface layer are integrated into one piece.

Figure 3:
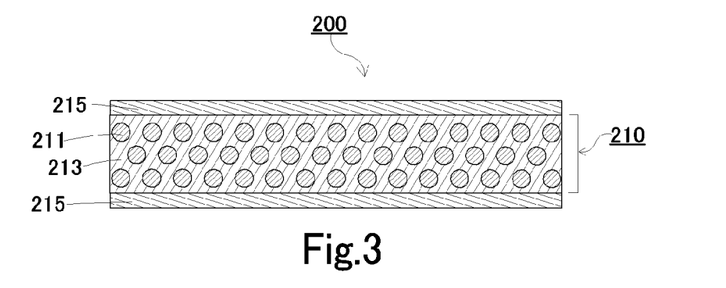
FIG. 3 is a schematic drawing showing the section of the prepreg of the second embodiment of the present invention.

FIG. 3 is a schematic drawing showing the section of the prepreg of the second embodiment. In FIG. 3, 200 is a prepreg of second embodiment and 210 is a primary prepreg. The primary prepreg 210 is constituted by a reinforcing fiber layer composed of a carbon fiber 211 and an epoxy resin composition [C] 213 impregnated into the reinforcing fiber layer. On the surface of the primary prepreg 210 is formed a surface layer composed of a resin composition [D] 215 integrally with the primary prepreg 210.

Figure 4A:
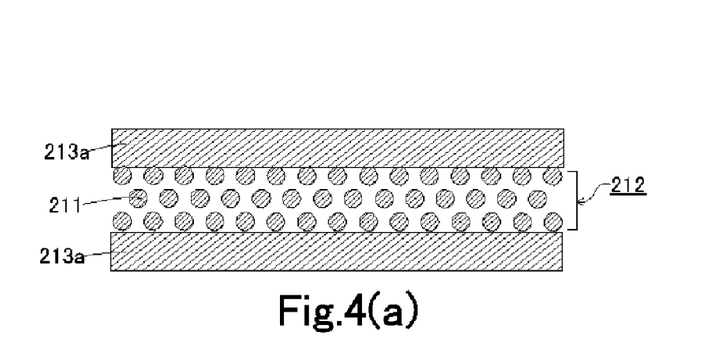
FIGS. 4(a) to 4(c) are drawings showing in order the process in which the prepreg of the second embodiment of the present invention is manufactured.
Figure 4B:
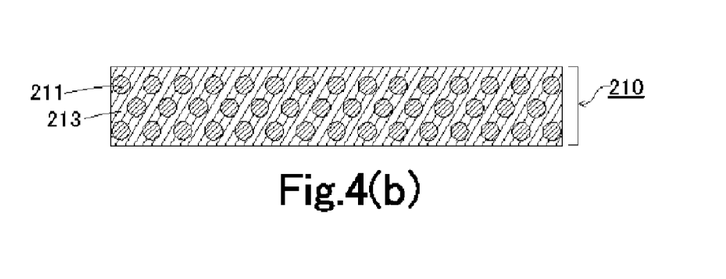

In the prepreg of the second embodiment of the present invention, the mass ratio of the epoxy resin contained in the epoxy resin composition [C] and the epoxy resin contained in the epoxy resin composition [D] is preferably 9:1 to 1:1.
(2) Primary Prepreg In the second embodiment of the present invention, the primary prepreg is composed of a reinforcing fiber layer present at the central portion of the prepreg section and an epoxy resin composition [C] impregnated into the reinforcing fiber layer. The primary prepreg is shown as primary prepreg 210 in FIG. 4(b) and FIG. 4(c).

The kind and shape of the reinforcing fiber substrate used in the primary prepreg are the same as those of the reinforcing fiber substrate described in the first embodiment.
(3) Epoxy Resin Composition [C]

The epoxy resin composition [C] is an epoxy resin composition containing at least an epoxy resin and a thermoplastic resin but containing no curing agent. Each component used in the epoxy resin composition [C] is described below.
(i) Epoxy Resin The kind, amount and form of the epoxy resin used in the second embodiment of the present invention are the same as those of the epoxy resin described in the first embodiment, except for the following point.

The amount of the trifunctional epoxy resin is preferably at least 30 mass %, particularly preferably 30 to 80 mass % relative to the total amount of the epoxy resins used in the epoxy resin composition [C] and the epoxy resin composition [D] (hereinafter, the total amount is referred to as "total epoxy resin amount" in some cases). When the amount exceeds 80 mass %, the prepreg obtained is low in handleability in some cases.

The amount of the trifunctional epoxy resin is preferably at least 10 mass %, particularly preferably 20 to 85 mass % relative to the epoxy resin amount contained in the epoxy resin composition [C].
(ii) Curing Agent The epoxy resin composition [C] contains no compound for curing the epoxy resin.
(iii) Thermoplastic Resin The kind, amount and form of the thermoplastic resin used in the second embodiment of the present invention are the same as those of the thermoplastic resin described in the first embodiment, except for the following point.

In order to obtain a composite material improved in impact resistance, it is requisite that the epoxy resin composition [C] contains an epoxy resin-soluble thermoplastic resin or an epoxy resin-insoluble thermoplastic resin. Preferably, the epoxy resin composition [C] contains both of an epoxy resin-soluble thermoplastic resin and an epoxy resin-insoluble thermoplastic resin.

The amount of the epoxy resin-soluble thermoplastic resin contained in the epoxy resin composition [C] is preferably 5 to 60 mass parts relative to 100 mass parts of the epoxy resins contained in the epoxy resin composition [C], in view of the processability of the primary prepreg.
(4) Epoxy Resin Composition [D]

Figure 4C:
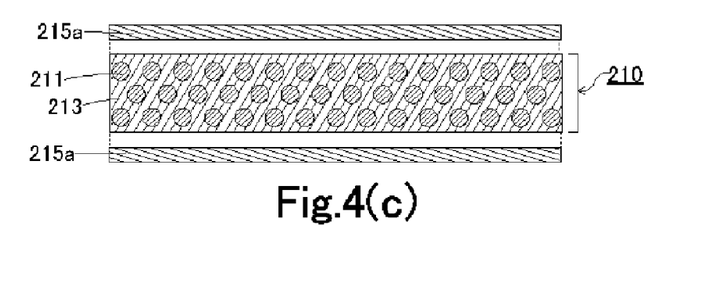

The epoxy resin composition [D] is composed of at least an epoxy resin, a curing agent thereof, and an epoxy resin-soluble thermoplastic resin dissolved in an epoxy resin. In FIG. 4(c), the epoxy resin composition [D] is a component constituting the surface layer 215a of the prepreg of the second embodiment. Each component constituting the epoxy resin composition [D] is described below.
(i) Epoxy Resin The kind, amount and form of the epoxy resin contained in the epoxy resin composition [D] are the same as those of the epoxy resin described in the first embodiment.
(ii) Curing Agent The kind of the during agent used in the second embodiment of the present invention is the same as that of the curing agent described in the first embodiment.

The amount of the curing agent contained in the epoxy resin composition [D] is an amount which is appropriate to cure the all the epoxy resins used in the epoxy resin composition [C] and the epoxy resin composition [D], and is controlled appropriately depending upon the kinds of epoxy resin used and curing agent used. For example, when an aromatic diamine compound is used as the curing agent, the amount thereof is preferably 25 to 55 mass parts relative to 100 mass parts of the total epoxy resins. From the standpoint of storage stability, the amount of curing agent is preferably 50 to 300 mass parts, particularly preferably 100 to 200 mass parts, relative to 100 mass parts of the epoxy resins contained in the epoxy resin composition [D].
(iii) Thermoplastic Resin The epoxy resin composition [D] contains a thermoplastic resin dissolved in an epoxy resin. The thermoplastic resin compounded in the epoxy resin composition [D] is an epoxy resin-soluble thermoplastic resin.

The kind and form of the epoxy resin-soluble thermoplastic resin are the same as those of the epoxy resin-soluble thermoplastic resin described in the first embodiment.

The content of the epoxy resin-soluble thermoplastic resin contained in the epoxy resin composition [D] is preferably 5 to 50 mass parts, particularly preferably 15 to 40 mass parts relative to 100 mass parts of the epoxy resins contained in the epoxy resin composition [D]. With a content of less than 5 mass parts, the composite material manufactured using the prepreg obtained has insufficient impact resistance in some cases. With a content exceeding 50 mass parts, the epoxy resin composition [D] has a strikingly high viscosity and is low in handleability in some cases.

(5) Method for Manufacturing of Prepreg

The method for manufacturing the prepreg of the second embodiment of the present invention is the same as the previously described method for manufacturing the prepreg of the first embodiment, except for that the epoxy resin composition [A], epoxy resin composition [B], resin A film and resin B film in the first embodiment are replaced respectively by epoxy resin composition [C], epoxy resin composition [D], resin C film and resin D film.

In the prepreg of the second embodiment of the present invention, manufactured by the above-mentioned method, an epoxy resin composition [C] 213 is impregnated into a reinforcing fiber layer, as shown in FIG. 3.

The prepreg of the second embodiment of the present invention may contain a stabilizer, a release agent, a filler, a coloring agent, etc. as long as the effect of the present invention is not impaired.

In the prepreg of the second embodiment of the present invention, the curing agent contained in the epoxy resin composition [D] is diffused into the epoxy resin composition [C] by the heating conducted to give rise to a curing reaction. Thereby, both the epoxy resin composition [C] and the epoxy resin composition [D] are cured.

Pluralities of the prepregs of the present invention are laminated and the laminate is molded and cured by an ordinary method, whereby a composite material can be manufactured. As the molding method, there can be mentioned, for example, press molding method, autoclave molding method, lapping tape method, and inner pressure molding method.

The composite material obtained using the prepreg of the present invention is preferably used in structural member for airplane, flier of wind mill, side board of automobile, computer applications (e.g. IC tray or housing of laptop PC), and sports applications (e.g. golf club shaft and tennis racket).

EXAMPLES

The present invention is described in more detail below by way of Examples. In the following Examples and Comparative Examples, the components and test methods used are as follows.
[Components]
(Reinforcing Fiber Layer)

As the reinforcing fiber layer, there was used a carbon fiber strand having a tensile strength of 5,800 MPa (590 kgf/mm$^2$) and an elastic modulus of 310 GPa (32 tf/mm$^2$).
(Thermosetting Resin)

Araldite MY0600 (trade name) (hereinafter described as "MY 0600"): a glycidylamine type epoxy resin (trifunctional group) produced by Huntsman Advanced Materials Co. Ltd.

Araldite MY0510 (trade name) (hereinafter described as "MY0510"): a glycidylamine type epoxy resin (trifunctional group) produced by Huntsman Advanced Materials Co. Ltd.

Sumi Epoxy ELM100 (trade name) (hereinafter described as "ELM100"): a glycidylamine type epoxy resin (trifunctional group) produced by Sumitomo Chemical Co., Ltd.

Epikote 604 (trade name) (hereinafter described as "jER604"): a glycidylamine type epoxy resin (tetrafunctional group) produced by Japan Epoxy Resin Co., Ltd.

Epikote 828 (trade name) (hereinafter described as "jER828"): a glycidylamine type epoxy resin (bifunctional group) produced by Japan Epoxy Resin Co., Ltd.
(Thermoplastic Resin)

PES-5003P (trade name): a polyethersulfone (particle diameters: 3 to 40 μm) produced by Sumitomo Chemical Co., Ltd.

TR-55 (trade name): GRILAMID (particle diameters: 5 to 35 μm) produced by EMS-CHEMIE (Japan) Ltd.
(Curing Agent)

3,3'-Diaminodiphenylsulfone (hereinafter described as "3,3'-DDS"): an aromatic amine type curing agent produced by NIHON GOSEI KAKO Co., Ltd.

4,4'-Diaminodiphenylsulfone (hereinafter described as "4,4'-DDS"): an aromatic amine type curing agent produced by Wakayama Seika Kogyo Co., Ltd.
[Water Absorption]

A prepreg was cut into a size of 100×100 mm and weighed for the mass (W1). Then, the cut-prepreg was submerged in water in a desiccator. The desiccator inside pressure was reduced to 10 kPa or lower to replace the air inside the prepreg with water. The prepreg was taken out of the water; the water on the prepreg surface was wiped off; and the prepreg was weighed for the mass (W2). Using these measurement values, the water absorption of the prepreg was calculated from the following formula.

Water absorption (%)=[(W2−W1)/W1]×100

W1: Mass (g) of prepreg
W2: Mass (g) of prepreg after water absorption
[Storage Stability at Room Temperature]

A prepreg was stored for 10 days at a temperature of 26.7° C. and a humidity of 65%. Then, the prepreg was cut and laminated in a mold to evaluate the storage stability at room temperature. The result of evaluation was indicated by the following yardsticks (○~X).

○: The prepreg after storage sufficiently follows the lamination in mold and shows almost the same state as right after production.

Δ: The prepreg causes a curing reaction during storage and, after storage, is slightly deteriorated in tackiness and draping property, but the prepreg after storage follows the lamination in mold and is usable with no problem.

X: The prepreg causes a curing reaction during storage and, after storage, is strikingly reduced in tackiness and draping property, and the prepreg after storage is difficult to laminate in a mold.
[Tackiness]

The tackiness of prepreg was measured by the following method using a tacking tester TAC-II (RHESCA CO., LTD.). A prepreg was set on a test stage maintained at 27° C., and a tack probe (made of SUS) of 5 mm in diameter, maintained at 27° C. was allowed to touch the prepreg at an initial load of 100 gf. The tack probe was released from the prepreg at a test speed (release speed) of 10 mm/sec, and the maximum value of the resistance which the tack probe received for the release, was recorded as load value. This tack probe test was conducted for a prepreg right after production and a prepreg obtained by storing the former prepreg for 10 days at a temperature of 26.7° C. and a humidity of 65%. The test results were indicated by the following yardsticks (○~X).

○: The load value of the tack probe test conducted right after prepreg production is 200 gf or larger and the load value of the tack probe test conducted after 10 days storage is 50 to 100% of the former value (hereinafter, this ratio is referred to also as "tack retention").

Δ: The load value of the tack probe test conducted right after prepreg production is 200 gf or larger and the tack retention after 10 days storage is 25 to 50%.

X: The load value of the tack probe test conducted right after prepreg production is 200 gf or larger and the tack retention after 10 days storage is 0 to 25%.

[Draping Property]

The draping property of prepreg was measured by the following test based on ASTM D 1388. A prepreg was cut in a 0° and 90° (relative to fiber direction) direction and measured for draping property (flexural rigidity, mg·cm) at an inclination of 41.5° (inclination angle). This measurement was conducted for a prepreg right after production and a prepreg obtained by storing the former prepreg for a given period at a temperature of 26.7° C. and a humidity of 65%. The measurement results were indicated by the following yardsticks (○~X).

○: The draping property after 20 days remains the same as right after prepreg production.

Δ: The draping property after 10 days remains the same as right after prepreg production but the draping property dropped slightly since then.

X: The draping property after 10 days was lower than that right after prepreg production and was a level at which the actual use of prepreg was questionable.

[Compression Strength after Impact (CAI)]

A prepreg was laminated to obtain a laminate having a lamination structure $[+45/0/-45/90]_{3s}$. The laminate was subjected to molding for 2 hours under the conditions of 0.59 MPa and 180° C., by an ordinary vacuum autoclave molding method. The molded material obtained was cut into a size of 101.6 mm (width)×152.4 mm (length) to obtain a test specimen for testing of compression strength after impact (CAI). Using this test specimen, the CAI after 30.5 J impact was measured.

[Interlaminar Toughness (GIc)]

A prepreg was cut into a given size and laminated into 10 layers in a 0° direction to produce a laminate. Between two such laminates was placed a release film in order to generate an initial crack, and they were integrated to obtain a prepreg laminate having a lamination structure $[0]_{20}$. The prepreg laminate was subjected to molding for 2 hours under the conditions of 0.59 MPa (pressure) and 180° C., using an ordinary vacuum autoclave molding method. The molded material (composite material) obtained was cut into a size of 12.7 mm (width)×304.8 mm (length) to obtain a test specimen for testing of interlaminar fracture toughness mode I (GIc). Using a test method for double cantilever beam interlaminar fracture toughness (DCB method), there were measured length of crack growth, load, and crack opening displacement to calculate GIc.

[Interlaminar Fracture Toughness Mode II (GIIc)]

A prepreg was cut into a given size and laminated into 10 layers in a 0° direction to produce a laminate. Between two such laminates was placed a release film in order to generate an initial crack, and they were integrated to obtain a prepreg laminate having a lamination structure $[0]_{20}$. The prepreg laminate was subjected to molding for 2 hours under the conditions of 0.59 MPa (pressure) and 180° C., using an ordinary vacuum autoclave molding method. The molded material (composite material) obtained was cut into a size of 12.7 mm (width)×304.8 mm (length) to obtain a test specimen for testing of interlaminar fracture toughness mode II (GIIc). Using this test specimen, GIIc test was conducted.

For the GIIc test, there was conducted an ENF test (end notched flexure test) in which flexural load was applied at three points.

The test specimen was placed on two fulcrums (the distance between the two fulcrums was 101.6 mm) so that the front end of the PTFE film (the above-mentioned release film placed between two laminates) of 25 μm in thickness was distant from one fulcrum by 38.1 mm. A flexural load was applied to the test specimen at a speed of 2.54 mm/min to generate an initial crack.

Then, the test specimen was placed on the fulcrums so that the front end of the initial crack was distant from the above-mentioned one fulcrum by 25.4 mm. A flexural load was applied to the test specimen at a speed of 2.54 mm/min.

Similarly, the test specimen was placed so that the front end of the crack generated above was distant from the fulcrum by 25.4 mm. A flexural load was applied to the test specimen at a speed of 2.54 mm/min. In this way, flexural test was conducted three times and GIIc was calculated from the load-stroke of each flexural test.

Examples 1 to 11, Comparative Examples 1 and 2

At first, components shown in Table 1 or 2 were mixed at 80° C. for 30 minutes using a stirrer to prepare epoxy resin compositions [A] and epoxy resin compositions [B]. Each epoxy resin composition [A] and each epoxy resin composition [B] were separately coated on a release film using a film coater, to obtain each resin A film and each resin B film.

Then, the previously-mentioned carbon fiber strand was fed (190 g/m²) in one direction between two same resin A films. They were passed through a hot roller (10 kg/cm, 130° C.) to obtain each primary prepreg.

Then, the primary prepreg was fed between two same resin B films. They were passed through a hot roller (1.5 kg/cm, 70° C.) to obtain each prepreg.

The content of resins in prepreg was 33 mass %. The properties of each prepreg obtained are shown in Table 1 or Table 2.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Resin composition [A] (mass parts) | Epoxy resin | MY0600 | 35 | 20 | | | 35 | | 50 | 35 | | | |
| | | MY0510 | | | 35 | | | | | | | | |
| | | ELM100 | | | | 35 | | 35 | | | | 35 | |
| | | jER604 | 65 | 80 | 65 | 65 | | | 50 | 65 | 100 | 65 | |
| | | jER828 | | | | | 65 | 65 | | | | | 100 |
| | Curing agent | 3,3'-DDS | 65 | 65 | 65 | 65 | 60 | 60 | 65 | | 63 | | 60 |
| | | 4,4'-DDS | | | | | | | | 65 | | 65 | |
| | Thermoplastic resin | PES5003P | 32 | 32 | 32 | 32 | 32 | 32 | 32 | 32 | 32 | 32 | 32 |
| | | TR-55 | 42 | 42 | 42 | 42 | 42 | 42 | 42 | 42 | 42 | 42 | 42 |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Resin composition [B] (mass parts) | Epoxy resin | MY0600 | 100 | 100 | | | 100 | 100 | 50 | 100 | | | |
| | | MY0510 | | | 100 | | | | | | | | |
| | | ELM100 | | | | 100 | | | | | | 100 | |
| | | jER604 | | | | | | | 50 | | 100 | | |
| | | jER828 | | | | | | | | | | | 100 |
| | Thermoplastic resin | PES5003P | 30 | 30 | 30 | 30 | 30 | 30 | 30 | 30 | 30 | 30 | 30 |
| Mass ratio of [A] and [B] (as epoxy resin) | | | 10:3 | 10:3 | 10:3 | 10:3 | 10:3 | 10:3 | 10:3 | 10:3 | 10:3 | 10:3 | 10:7 |
| Resin formulation of prepreg (mass ratio) | Trifunctional epoxy resins | | 50 | 39 | 50 | 50 | 50 | 50 | 50 | 50 | 0 | 50 | 0 |
| | Other epoxy resins | | 50 | 61 | 50 | 50 | 50 | 50 | 50 | 50 | 100 | 50 | 100 |
| | Curing agent | | 50 | 50 | 50 | 50 | 46 | 46 | 50 | 50 | 48 | 50 | 35 |
| | Thermoplastic resins | | 64 | 64 | 64 | 64 | 64 | 64 | 64 | 64 | 64 | 64 | 56 |
| Test results | Water absorption (%) | | 10 | 10 | 10 | 8 | 8 | 8 | 9 | 10 | 14 | 8 | 8 |
| | Storage stability at room temperature | | Δ | ○ | ○ | ○ | Δ | ○ | Δ | ○ | ○ | ○ | ○ |
| | Tackiness | | ○ | ○ | ○ | ○ | Δ | Δ | Δ | ○ | ○ | ○ | ○ |
| | Draping property | | Δ | Δ | Δ | Δ | Δ | ○ | Δ | ○ | ○ | ○ | ○ |
| | CAI (ksi) | | 51 | 48 | 46 | 46 | 45 | 46 | 51 | 42 | 43 | 41 | 37 |
| | GIc (in-lb/in$^2$) | | 2.5 | 2.4 | 2.2 | 2.2 | 2.2 | 2.1 | 2.5 | 2.0 | 2.1 | 1.9 | 1.5 |
| | GIIc (in-lb/in$^2$) | | 13 | 12 | 10.5 | 10.5 | 11 | 10.5 | 13 | 9.5 | 10.5 | 9.5 | 7.7 |

In Example 1, CAI, GIc and GIIc (hereinafter referred to also as "composite properties") were very high; tackiness retention after 10 days storage was 55%; and draping property was relatively good.

In Example 2, composite properties were very high; tackiness retention after 10 days storage was 60%; and draping property was relatively good.

In Example 3, composite properties were high; tackiness retention after 10 days storage was 55%; and draping property was relatively good.

In Example 4, composite properties were high; tackiness retention after 10 days storage was 65%; and draping property was relatively good.

In Example 5, composite properties were high; tackiness retention after 10 days storage was 45%; and draping property was relatively good.

In Example 6, composite properties were very high; tackiness retention after 10 days storage was 40%; and draping property was good.

In Example 7, composite properties were very high; tackiness retention after 10 days storage was 40%; and draping property was relatively good.

In Example 8, tackiness retention after 10 days storage was 70% and draping property was good; however, composite properties dropped slightly because 4,4'-DDS was used as the curing agent.

In Example 9, tackiness retention after 10 days storage was 80% and draping property was good; however, composite properties dropped slightly because no trifunctional glycidylamine type epoxy resin was used.

In Example 10, tackiness retention after 10 days storage was 55% and draping property was good; however, composite properties dropped slightly because 4,4'-DDS was used as the curing agent.

In Example 11, tackiness retention after 10 days storage was 80% and draping property was good; however, composite properties dropped slightly because no trifunctional glycidylamine type epoxy resin was used.

TABLE 2

|  |  |  | Comp. Ex. 1 | Comp. Ex. 2 |
|---|---|---|---|---|
| Resin composition [A] (mass parts) | Epoxy resin | MY0600 | 70 | 50 |
| | | jER604 | 30 | 50 |
| | Curing agent | 3,3'-DDS | 51 | 50 |
| | Thermoplastic resin | PES5003P | 16 | 30 |
| | | TR-55 | 47 | 33 |
| Resin composition [B] (mass parts) | Epoxy resin | MY0600 | | 50 |
| | | jER604 | 100 | 50 |
| | Curing agent | 3,3'-DDS | 48 | 50 |
| | Thermoplastic resin | PES5003P | 35 | 30 |
| | | TR-55 | 25 | 33 |
| Mass ratio of [A] and [B] (as epoxy resin) | | | 10:3 | 10:3 |
| Resin formulation of prepreg (mass ratio) | Trifunctional epoxy resins | | 54 | 50 |
| | Other epoxy resins | | 46 | 50 |
| | Curing agent | | 50 | 50 |
| | Thermoplastic resins | | 62 | 63 |
| Test results | Water absorption (%) | | 8 | 14 |
| | Storage stability at room temperature | | X | X |
| | Tackiness | | ○ | X |
| | Draping property | | X | X |
| | CAI (ksi) | | 51 | 51 |
| | GIc (in-lb/in$^2$) | | 2.4 | 2.4 |
| | GIIc (in-lb/in$^2$) | | 13 | 13 |

In Comparative Example 1, tackiness retention after 10 days storage was good at 52%; however, the presence of a high concentration of a trifunctional glycidylamine type epoxy resin (MY0600) and a curing agent (3,3'-DDS) in the inner layer caused striking reduction in storage stability at room temperature and draping property.

In Comparative Example 2, the presence of a high concentration of MY0600 and a curing agent (3,3'-DDS) in both the impregnated layer (inner layer) and the tackiness layer (surface layer) caused striking reduction in storage stability at room temperature, tackiness retention and draping property. Tackiness retention after 10 days storage was very low at 10%.

Comparative Examples 3 to 8

At first, components shown in Table 3 were homogeneously mixed at 80° C. for 30 minutes using a stirrer, to obtain each resin composition. The resin composition was coated on a release film using a film coater to obtain each resin film of 5 g/m$^2$ to 40 g/m$^2$.

Then, the previously-mentioned carbon fiber strand was fed (190 g/m²) in one direction between two same resin films obtained above. They were passed through a hot roller (5 kg/cm, 130° C.) to obtain each prepreg.

The content of resins in prepreg was 33 mass %. The properties of each prepreg obtained are shown in Table 3.

TABLE 3

|  |  |  | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Resin composition (mass parts) | Epoxy resin | MY0600 | 100 | 50 |  |  | 25 | 10 |
|  |  | MY0510 |  |  | 50 |  |  |  |
|  |  | ELM100 |  |  |  | 100 |  |  |
|  |  | jER604 |  | 50 | 50 |  | 75 | 90 |
|  | Curing agent | 3,3'-DDS | 52 | 50 | 52 | 52 | 49 | 48 |
|  | Thermoplastic resin | PES5003P | 30 | 30 | 30 | 30 | 30 | 30 |
| Test results | Water absorption (%) |  | 26 | 26 | 26 | 20 | 30 | 32 |
|  | Storage stability at room temperature |  | X | X | X | X | Δ | ○ |
|  | Tackiness |  | X | X | X | X | X | X |
|  | Draping property |  | Δ | Δ | Δ | Δ | Δ | Δ |
|  | CAI (ksi) |  | 53 | 50 | 45 | 45 | 46 | 43 |
|  | GIc (in-lb/in²) |  | 2.5 | 2.3 | 2.2 | 2.2 | 2.2 | 2.0 |
|  | GIIc (in-lb/in²) |  | 13 | 12 | 11 | 11 | 11 | 10.5 |

In Comparative Examples 3 to 6, resin impregnation in prepreg was inferior because impregnation was conducted in one step. Also, due to the presence of a high concentration of a trifunctional glycidylamine type epoxy resin and its curing reaction with 3,3'-DDS, storage stability at room temperature, tackiness retention and draping property were strikingly low, making difficult the use of prepreg. Each prepreg of Comparative Examples 3 to 6 had a tackiness retention after 10 days storage, of 10% or lower.

In Comparative Examples 7 to 8, resin impregnation in prepreg was inferior because impregnation was conducted in one step. Also, the resin of surface layer sank with the passage of time and the tackiness of prepreg dropped strikingly, making difficult the use of prepreg. Each prepreg of Comparative Examples 7 to 8 had a tackiness retention after 10 days storage, of 10% or lower.

Examples 12 to 18, Comparative Examples 9 and 10

At first, components shown in Table 4 or 5 were mixed at 80° C. for 30 minutes using a stirrer to prepare epoxy resin compositions [C] and epoxy resin compositions [D]. Each epoxy resin composition [C] and each epoxy resin composition [D] were separately coated on a release film using a film coater, to obtain each resin C film and each resin D film.

Then, the previously-mentioned carbon fiber strand was fed (190 g/m²) in one direction between two same resin C films. They were passed through a hot roller (15 kg/cm, 130° C.) to obtain each primary prepreg.

Then, the primary prepreg was fed between two same resin D films. They were passed through a hot roller (1.5 kg/cm, 70° C.) to obtain each prepreg.

The content of resins in prepreg was 33 mass %. The properties of each prepreg obtained are shown in Table 4 or Table 5.

TABLE 4

|  |  |  | Ex. 12 | Ex. 13 | Ex. 14 | Ex. 15 | Ex. 16 | Ex. 17 | Ex. 18 |
|---|---|---|---|---|---|---|---|---|---|
| Resin composition [C] (mass parts) | Epoxy resin | MY0600 | 100 | 50 | 80 | 70 |  |  | 60 |
|  |  | MY0510 |  | 50 |  |  | 100 |  | 20 |
|  |  | ELM100 |  |  |  |  |  | 100 |  |
|  |  | jER604 |  |  | 20 | 30 |  |  | 20 |
|  | Thermoplastic resin | PES5003P | 33 | 33 | 33 | 33 | 33 | 33 | 33 |
|  |  | TR-55 | 48 | 48 | 48 | 48 | 48 | 48 | 48 |
| Resin composition [D] (mass parts) | Epoxy resin | MY0600 |  |  |  | 10 |  |  | 20 |
|  |  | jER604 | 100 | 100 | 100 | 90 | 100 | 100 | 80 |
|  | Curing agent | 3,3'-DDS | 158 | 158 | 158 | 158 | 158 | 158 | 158 |
|  | Thermoplastic resin | PES5003P | 25 | 25 | 25 | 25 | 25 | 25 | 25 |
| Mass ratio of [C] and [D] (as epoxy resin) |  |  | 13:6 | 13:6 | 13:6 | 13:6 | 13:6 | 13:6 | 13:6 |
| Resin formulation of prepreg (mass ratio) | Trifunctional epoxy resins |  | 68 | 68 | 55 | 51 | 68 | 68 | 61 |
|  | Other epoxy resins |  | 32 | 32 | 45 | 49 | 32 | 32 | 39 |
|  | Curing agent |  | 50 | 50 | 50 | 50 | 50 | 50 | 50 |
|  | Thermoplastic resins |  | 63 | 63 | 63 | 63 | 63 | 63 | 63 |
| Test results | Water absorption (%) |  | 10 | 10 | 10 | 8 | 8 | 8 | 9 |
|  | Storage stability at room temperature |  | ○ | ○ | ○ | ○ | Δ | ○ | Δ |

TABLE 4-continued

|  | Ex. 12 | Ex. 13 | Ex. 14 | Ex. 15 | Ex. 16 | Ex. 17 | Ex. 18 |
|---|---|---|---|---|---|---|---|
| Tackiness | ○ | ○ | ○ | ○ | Δ | Δ | Δ |
| Draping property | ○ | ○ | Δ | Δ | Δ | ○ | Δ |
| CAI (ksi) | 51 | 48 | 46 | 46 | 45 | 46 | 46 |
| GIc (in-lb/in$^2$) | 2.5 | 2.4 | 2.2 | 2.2 | 2.2 | 2.1 | 2.5 |
| GIIc (in-lb/in$^2$) | 13 | 12 | 11 | 10.5 | 11 | 11 | 12 |

In Example 12, composite properties were very high, tackiness retention after 10 days storage was 65%, and draping property was relatively good.

In Example 13, composite properties were very high, tackiness retention after 10 days storage was 60%, and draping property was relatively good.

In Example 14, composite properties were high, tackiness retention after 10 days storage was 55%, and draping property was relatively good.

In Example 15, composite properties were high, tackiness retention after 10 days storage was 65%, and draping property was relatively good.

In Example 16, composite properties were high, tackiness retention after 10 days storage was 45%, and draping property was relatively good.

In Example 17, composite properties were high, tackiness retention after 10 days storage was 40%, and draping property was good.

In Example 18, composite properties were high, tackiness retention after 10 days storage was 40%, and draping property was relatively good.

TABLE 5

|  |  |  | Comp. Ex. 9 | Comp. Ex. 10 |
|---|---|---|---|---|
| Resin composition [C] (mass parts) | Epoxy resin | MY0600 | 70 | 50 |
|  |  | jER604 | 30 | 50 |
|  | Curing agent | 3,3'-DDS | 51 | 50 |
|  |  | 4,4'-DDS |  |  |
|  | Thermoplastic Resin | PES5003P | 16 | 30 |
|  |  | TR-55 | 47 | 33 |
| Resin composition [D] (mass parts) | Epoxy resin | MY0600 |  | 50 |
|  |  | jER604 | 100 | 50 |
|  | Curing agent | 3,3'-DDS | 48 | 50 |
|  | Thermoplastic Resin | PES5003P | 35 | 30 |
|  |  | TR-55 | 25 | 33 |
| Mass ratio of [C] and [D] (as epoxy resin) |  |  | 13:6 | 13:6 |
| Resin formulation | Trifunctional epoxy resins |  | 48 | 50 |
| of prepreg (mass ratio) | Other epoxy resins |  | 52 | 50 |
|  | Curing agent |  | 50 | 50 |
|  | Thermoplastic resins |  | 62 | 63 |
| Test results | Water absorption (%) |  | 8 | 14 |
|  | Storage stability at room temperature |  | X | X |
|  | Tackiness |  | ○ | X |
|  | Draping property |  | X | X |
|  | CAI (ksi) |  | 51 | 51 |
|  | GIc (in-lb/in$^2$) |  | 2.4 | 2.4 |
|  | GIIc (in-lb/in$^2$) |  | 13 | 13 |

In Comparative Example 9, tackiness retention after 10 days storage was good at 52%; however, the presence of a high concentration of a trifunctional glycidylamine type epoxy resin (MY0600) and a curing agent (3,3'-DDS) in the inner layer caused striking reduction in storage stability at room temperature and draping property.

In Comparative Example 10, the presence of a high concentration of a trifunctional glycidylamine type epoxy resin (MY0600) and a curing agent (3,3'-DDS) in both the impregnated layer (inner layer) and the tackiness layer (surface layer) caused striking reduction in storage stability at room temperature, tackiness retention and draping property. Tackiness retention after 10 days storage was very low at 10%.

Comparative Examples 11 to 16

At first, components shown in Table 6 were homogeneously mixed at 80° C. for 30 minutes using a stirrer, to obtain each resin composition. The resin composition was coated on a release film using a film coater to obtain each resin film of 5 g/m$^2$ to 40 g/m$^2$.

Then, the previously-mentioned carbon fiber strand was fed (190 g/m$^2$) in one direction between two same resin films obtained above. They were passed through a hot roller (5 kg/cm, 130° C.) to obtain each prepreg.

The content of resins in prepreg was 33 mass %. The properties of each prepreg obtained are shown in Table 6.

TABLE 6

|  |  |  | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|
| Resin composition (mass parts) | Epoxy resin | MY0600 | 100 | 50 |  |  | 25 | 10 |
|  |  | MY0510 |  |  | 50 |  |  |  |
|  |  | ELM100 |  |  |  | 100 |  |  |
|  |  | jER604 |  | 50 | 50 |  | 75 | 90 |
|  | Curing agent | 3,3'-DDS | 52 | 50 | 52 | 52 | 49 | 48 |
|  | Thermoplastic resin | PES5003P | 31 | 31 | 31 | 31 | 31 | 31 |
|  |  | TR-55 | 32 | 32 | 32 | 32 | 32 | 32 |
| Test results | Water absorption (%) |  | 26 | 26 | 26 | 20 | 30 | 32 |
|  | Storage stability at room temperature |  | X | X | X | X | Δ | ○ |
|  | Tackiness |  | X | X | X | X | X | X |
|  | Draping property |  | Δ | Δ | Δ | Δ | Δ | Δ |
|  | CAI (ksi) |  | 53 | 50 | 45 | 45 | 46 | 43 |

TABLE 6-continued

|  | Comp. Ex. 11 | Comp. Ex. 12 | Comp. Ex. 13 | Comp. Ex. 14 | Comp. Ex. 15 | Comp. Ex. 16 |
|---|---|---|---|---|---|---|
| GIc (in-lb/in$^2$) | 2.5 | 2.3 | 2.2 | 2.2 | 2.2 | 2.0 |
| GIIc (in-lb/in$^2$) | 13 | 12 | 11 | 11 | 11 | 10.5 |

In Comparative Examples 11 to 16, resin impregnation in prepreg was inferior because impregnation was conducted in one step. Also, due to the presence of a high concentration of a trifunctional glycidylamine type epoxy resin and its reaction with 3,3'-DDS, storage stability at room temperature, tackiness retention and draping property were strikingly low, making difficult the use of prepreg. Each prepreg of Comparative Examples 11 to 16 had a tackiness retention after 10 days storage, of 10% or lower.

In Comparative Examples 15 to 16, resin impregnation in prepreg was inferior because impregnation was conducted in one step. Also, the resin of surface layer sank with the passage of time and the tackiness of prepreg dropped strikingly, making difficult the use of prepreg. Each prepreg of Comparative Examples 15 to 16 had a tackiness retention after 10 days storage, of 10% or lower.

The invention claimed is:

1. A prepreg comprising:
a primary prepreg composed of a reinforcing fiber substrate and an epoxy resin composition containing at least an epoxy resin in uncured state which can be cured by a reaction with a curing agent, and 5 to 50 mass parts of an epoxy resin-soluble thermoplastic resin relative to 100 mass parts of the total epoxy resins used in the prepreg, dissolved in the epoxy resin, impregnated into a reinforcing fiber layer formed by the reinforcing fiber substrate, and
a surface layer composed of an epoxy resin composition containing at least an epoxy resin in uncured state which can be cured by a reaction with the curing agent, and an epoxy resin-soluble thermoplastic resin dissolved in the epoxy resin, the surface layer being formed on one side or both sides of the primary prepreg,
wherein only either of the epoxy resin composition of the primary prepreg and the epoxy resin composition of the surface layer contains the curing agent for epoxy resin in an amount appropriate to cure the total amount of the epoxy resins contained in the prepreg.

2. The prepreg according to claim 1, wherein the epoxy-resin-soluble thermoplastic resin is at least one kind selected from polyethersulfone, polysulfone, polyetherimide and polycarbonate.

3. A prepreg comprising:
a primary prepreg composed of a reinforcing fiber substrate and an epoxy resin composition [A] impregnated into a reinforcing fiber layer formed by the reinforcing fiber substrate, and
a surface layer composed of an epoxy resin composition [B], formed on one side or both sides of the primary prepreg,
wherein:
the epoxy resin composition [A]: is an epoxy resin composition containing at least an epoxy resin in uncured state which can be cured by a reaction with a curing agent, the curing agent for epoxy resin in an amount appropriate to cure the total amount of the epoxy resins contained in the prepreg, and 5 to 50 mass parts of an epoxy-resin soluble thermoplastic resin relative to 100 mass parts of the total epoxy resins used in the prepreg, dissolved in the epoxy resin, and
the epoxy resin composition [B]: is an epoxy resin composition containing at least an epoxy resin in uncured state which can be cured by a reaction with the curing agent, and an epoxy resin-soluble thermoplastic resin dissolved in the epoxy resin but containing no curing agent for epoxy resin.

4. The prepreg according to claim 3, wherein at least 30% by mass of the total amount of the epoxy resins contained in the epoxy resin composition [A] and the epoxy resin composition [B] is a tri-functional epoxy resin.

5. The prepreg according to claim 3, wherein the epoxy resin composition [A] further contains an epoxy resin-insoluble thermoplastic resin.

6. The prepreg according to claim 5, wherein the epoxy resin-insoluble thermoplastic resin is at least one kind selected from amorphous nylon, nylon 6, nylon 12 and amorphous polyimide.

7. The prepreg according to claim 3, wherein the curing agent contained in the epoxy resin composition [A] is an aromatic diamine compound.

8. The prepreg according claim 7, wherein the aromatic diamine compound is 3,3'-diaminodiphenylsulfone.

9. The prepreg according to claim 7, wherein the aromatic diamine compound is 25 to 55 parts by mass relative to 100 parts by mass of the total epoxy resin used in the prepreg.

10. The prepreg according to claim 3, wherein the amount of the curing agent for epoxy resin is 60 to 100 parts by mass relative to 100 parts by mass of the epoxy resin contained in the primary prepreg.

11. A method for manufacturing a prepreg, which comprises:
impregnating an epoxy resin composition [A] into a reinforcing fiber layer formed by a reinforcing fiber substrate to obtain a primary prepreg,
then, placing, on one side or both sides of the primary prepreg, an epoxy resin composition [B] to make the epoxy resin composition [B] integral with the primary prepreg, wherein:
the epoxy resin composition [A]: is an epoxy resin composition containing at least an epoxy resin in uncured state which can be cured by a reaction with a curing agent, the curing agent for epoxy resin in an amount appropriate to cure the total amount of the epoxy resins contained in the prepreg, and 50 to 50 mass parts of an epoxy resin-soluble thermoplastic resin relative to 100 mass parts of the total epoxy resins used in the prepreg, dissolved in the epoxy resin, and
the epoxy resin composition [B]: is an epoxy resin composition containing at least an epoxy resin in uncured state which can be cured by a reaction with the curing agent, and an epoxy resin-soluble thermoplastic resin dissolved in the epoxy resin but containing no curing agent for epoxy resin.

* * * * *